Dec. 3, 1963   C. L. COLDREN ETAL   3,112,988
MIXING GASES AT SUPERSONIC VELOCITY
Original Filed Feb. 26, 1960                3 Sheets—Sheet 1

INVENTORS:
CLARKE L. COLDREN
CHARLES R. GARBETT

BY: *Oswald H. Wilmore*

THEIR ATTORNEY

Dec. 3, 1963    C. L. COLDREN ETAL    3,112,988
MIXING GASES AT SUPERSONIC VELOCITY
Original Filed Feb. 26, 1960    3 Sheets-Sheet 3

INVENTORS:
CLARKE L. COLDREN
CHARLES R. GARBETT

BY: *Oswald N. Michmore*

THEIR ATTORNEY

United States Patent Office 3,112,988
Patented Dec. 3, 1963

3,112,988
MIXING GASES AT SUPERSONIC VELOCITY
Clarke L. Coldren, Houston, Tex., and Charles R. Garbett, Los Altos, Calif., assignors to Shell Oil Company, New York, N.Y., a corporation of Delaware
Original application Feb. 26, 1960, Ser. No. 11,233. Divided and this application May 14, 1962, Ser. No. 194,358
8 Claims. (Cl. 23—1)

The invention relates to a method for commingling two gases at supersonic velocity and is a division of our application Serial No. 11,233, filed February 26, 1960.

It is known to mix gases by feeding them from single or multiple inlets into a mixing chamber within which turbulent mixing occurs or through which the gases flow at sub-sonic velocity. Intermixing of the gases is rapid in such devices; even when the gases are charged through an elongated mixing duct as parallel streams substantially complete mixing can usually be achieved at a distance of seven to fifteen times the diameter of the initial individual streams.

In certain industrial processes, as in the mixing of chemically reactive gases, it would be desirable to mix the gases while flowing at supersonic speeds and to maintain such speed without shock waves until mixing is complete or substantially so. For example, when a gaseous stream such as oxygen is to be mixed with a hydrocarbon, such as methane or ethane, and brought rapidly to reaction temperature only after thorough mixing, it is advantageous to raise the energy of one or both of the gases to a high level by heating them separately to temperatures above reaction temperature, reduce the temperatures without significant loss of energy prior to mixing, and to effect a rise in temperature only after mixing. Such a sequence of steps might be conceived to include expanding the two gases through separate nozzles which accelerate the gases to supersonic speeds, thereby inherently reducing their temperatures, flowing the resultant supersonic streams in lateral contact to effect mixing, and thereafter bringing the mixture to reaction temperature by deceleraing the streams to sub-sonic velocity, e.g., by forming a shock wave. Mixing streams at supersonic speeds would be desirable also for other reasons, such as that of achieving extremely high-velocity flow of a reacting mixture through an elongated reaction zone to a quenching zone, whereat the reaction is stopped, e.g., by spray quenching or isentropic expansion, as when performing reactions at controlled, short durations; the high velocity would then be useful for affording a better control of the reaction time. The use of quenching is useful in a reactor when it is necessary to preserve desirable products at equilibrium state corresponding to a high-temperature level, and also in the event that it is desired to preserve transient molecular species which exist only for a small fraction of a second after the initiation of the reaction but which would be destroyed upon further approach to equilibrium.

A difficulty of such supersonic mixing has been that supersonic streams mix very slowly. Thus, lateral mixing of gases in adjacent, supersonic streams is complete only after flow through mixing zones many times as long in the case of sub-sonic streams. Experimental data suggest that such streams must traverse mixing zones from twenty to over a hundred times the stream diameters before reasonably complete mixing is effected. One obvious way to achieve more rapid mixing is, of course, to employ gas streams flowing at sub-sonic velocities; however, this is ruled out when, as in the examples noted above, supersonic flow without deceleration in advance of substantial or complete mixing is a process requirement.

It is the object of the invention to achieve the lateral mixing of gaseous streams having supersonic velocities within a shorter mixing zone than was heretofore feasible.

A further object is to provide a method for mixing two or more gases which are mutually reactive and are at supersonic speeds, wherein lateral mixing occurs within a shorter axial distance while shock waves or decelerations of the gas streams, such as would result in heating to reaction temperature, are avoided until mixing is substantially complete.

According to the invention the foregoing objects are attained by subdividing source streams of different gases into multiplicities of narrow, smaller streams, accelerating each narrow stream to supersonic velocity, discharging the resultant streams into an elongated mixing zone in interspersed relation, i.e., so that each (except those at the periphery of the zone) is laterally adjacent to a plurality of narrow streams of another gas, and flowing the said narrow streams at supersonic velocity through the mixing zone while lateral mixing between them takes place.

By thus dividing the source streams into many parts and introducing them as a multiplicity of narrow streams the gases are mixed more rapidly even though they are moving at supersonic speeds.

The velocities of the individual streams may be identical and will, in any case, be not far apart, so as to avoid strong shock waves which dissipate kinetic energy to heat. However, according to a feature of the invention lateral mixing between the narrow streams is promoted by deliberately introducing a small mismatch between the stream velocities, e.g., less than 10%, to produce mild shock waves, insufficient to bring about a reactive condition but nevertheless effective to promote the movement of gas molecules between the narrow streams across the boundaries between streams.

The above operations can be carried out by means of an array of supersonic nozzles which includes a group of supersonic nozzles for each gas, the nozzles of each group being situated to be closely adjacent to and, except for those at the periphery of the array, surrounded by a plurality of nozzles of another group. Such an array may be mounted transversely to a duct (which may constitute the upstream section of a reaction chamber). In most applications it is desirable to maintain supersonic flow downstream from the nozzles for a distance sufficient to effect substantially complete mixing without deceleration of the gas streams, so as to maintain the temperature low and avoid dissipation of kinetic energy. To this end the nozzles should be designed and oriented to emit well formed gas streams moving along substantially parallel paths and at the same velocity and to arrange the duct without obstruction or surface irregularity which would create shock waves for the required distance, usually over twenty times and in some cases one hundred or several hundred times the initial diameter of the largest narrow gas stream. The duct may have a uniform or a gradually changing, preferably divergent, cross sectional area, free from angular changes in direction or other irregularities. Each nozzle has a convergent section at the upstream end, and a divergent section which may be joined directly to the convergent section at the nozzle throat or which may be separated from the convergent section by a short throat section or uniform cross section. The dimensions of the nozzles may be the same within each group, although those at the periphery of the array are in some instances smaller. The nozzles of one group may, however, be made wider or narrower and/or may be more or less numerous than those of another group, in accordance with the total mass flow rates of the several gases.

The supersonic nozzles may have any desired cross sectional shape which will produce well formed supersonic jets. For example, axially symmetrical or two-dimensional nozzles may be used. They are advantageously situated so closely adjacent to each other that the nozzle walls separating adjacent nozzles of different groups are tapered to a thin or sharp edge at the downstream ends of the nozzles.

The invention will be further described with reference to the accompanying drawings forming a part of this specification and showing certain illustrative embodiments, wherein.

Figure 2:
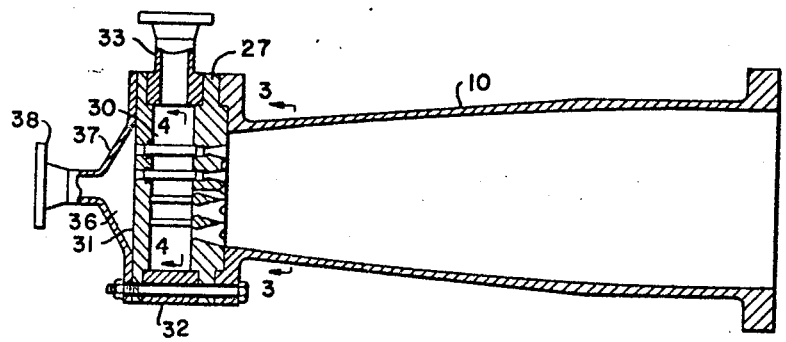
FIGURE 2 is a longitudinal sectional view of the nozzle array using axially symmetrical nozzles and showing a part of the duct.
Figure 3:
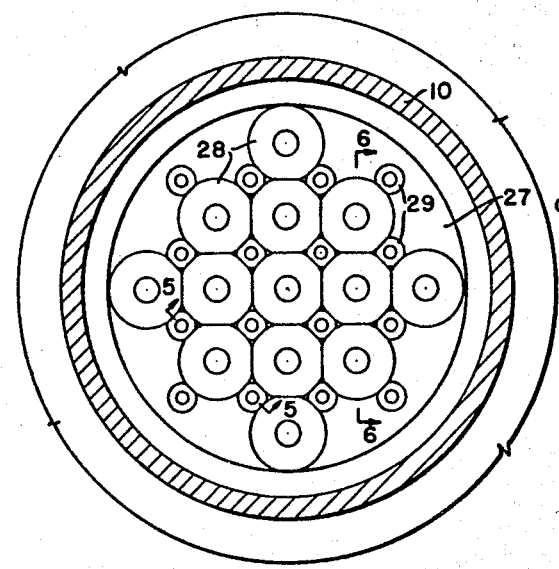
Figures 6, 7:
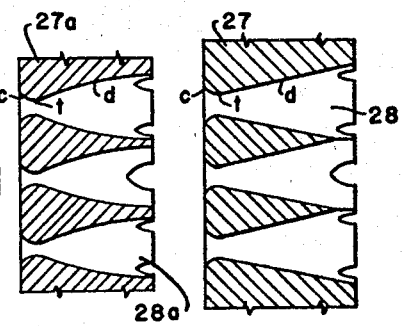
Figure 4:
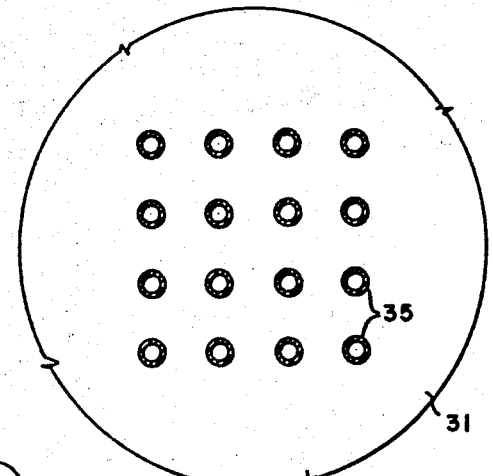
Figure 5:
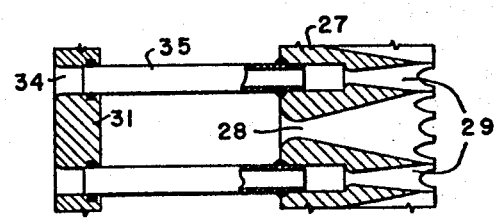
Figure 8:
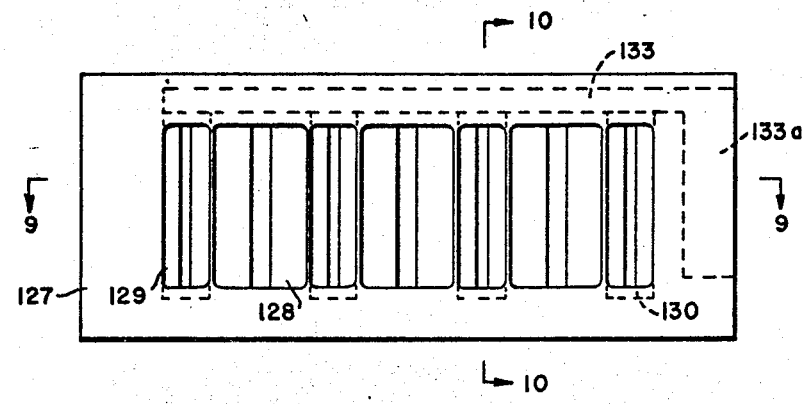
Figure 9:
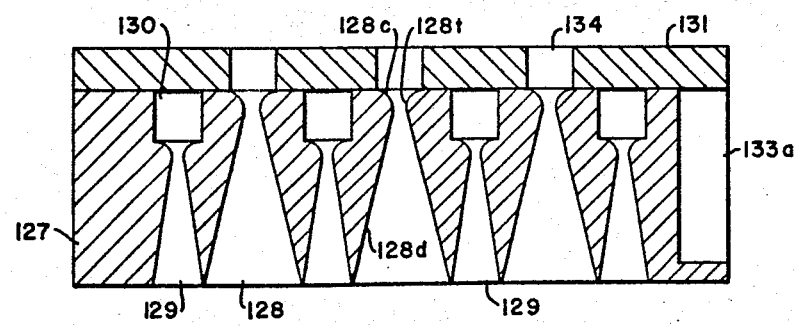
Figure 10:
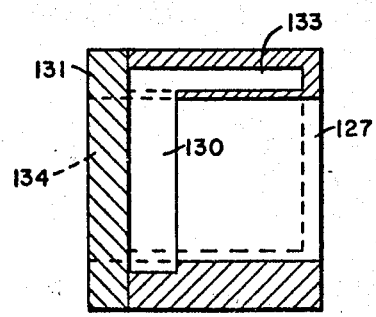

FIGURES 3 and 4 are enlarged, transverse sections, taken on the lines 3—3 and 4—4, respectively, of FIGURE 2;

FIGURES 5 and 6 are further enlarged fragmentary longitudinal sectional views of the nozzle array, taken on the lines 5—5 and 6—6, respectively, of FIGURE 3;

FIGURE 7 is a view similar to FIGURE 6, showing a modified shape of the nozzles;

FIGURE 8 is an elevation view of a nozzle array according to a modified design, employing two-dimensional nozzles; and FIGURES 9 and 10 are sectional views taken on the lines 9—9 and 10—10, respectively, of FIGURE 8.

Figure 1:
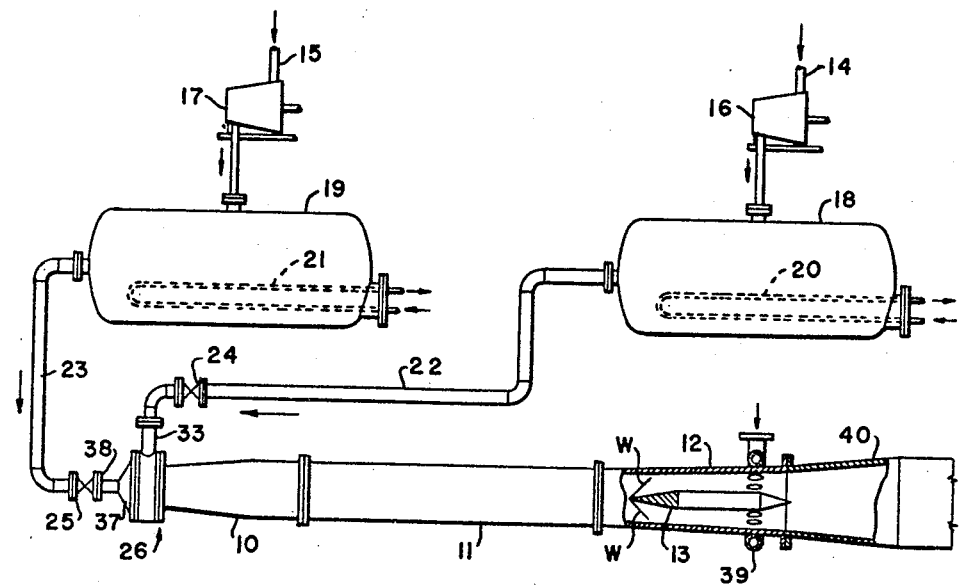
FIGURE 1 is a diagrammatic, elevation view of a shock wave reactor in which the invention is applied.

Referring to FIGURE 1, the apparatus comprises a duct having an upstream, moderately divergent section 10 and a downstream section 11, which may be cylindrical or very slightly divergent (the divergence being too slight to appear on the drawing) and may, for example, be connected to a reactor 12 exemplified as a shock wave reactor. The reactor shown is divergent and contains a wedge 13 for creating a strong shock wave. Upstream from the wedge the walls of the duct are continuously smooth and without angular changes in direction, it being noted that the internal surface of the divergent section 10 is curved in longitudinal section to merge with the surface of section 11. The gases to be mixed, for example reactive gases such as oxygen and propane, are supplied from sources 14 and 15, compressed in compressors 16 and 17, and passed through heaters which are schematically represented by vessels 18 and 19 containing heating coils, viz., fired tubes, 20 and 21. These gases are supplied via pipes 22 and 23 at rates controlled by valves 24 and 25 to the nozzle array 26.

The nozzle array, shown in FIGURES 2–6, comprises a nozzle plate 27 containing a first group of nozzles 28 distributed over the area of the plate and interspersed with a second group of nozzles 29. The plate is mounted transversely to the duct 10 so that the nozzle axes are directed downstream with substantially parallel axes. It will be understood that a small divergence in the nozzle axes may be used when the duct 10 is divergent, as shown. Each nozzle has a short convergent section $c$, a throat $t$ and a longer divergent section $d$ which may be flared along a desired contour, e.g., with uniformly diverging side walls in the divergent section $d$ as shown in FIGURES 2, 5 and 6; or with a divergent section as shown in FIGURE 7, wherein the divergence of the nozzle 28a becomes smaller toward the downstream end of the nozzle and the trace of the divergent wall $d$ in longitudinal section is inwardly concave. A similar contour may be used for the nozzles 29. In either case the nozzles are axially symmetrical.

The design of supersonic flow nozzles is well known per se and will not, therefore, be described herein. The general principles governing flow through nozzles is described by Faires in "Applied Thermodynamics," 1938, pp. 137–145, and by Shapiro in "The Dynamics and Thermodynamics of Compressible Flow," 1953, chapter 4. In brief, it may be noted that the supersonic nozzle is characterized by two distinct regions: In the convergent region the velocity increases more rapidly than the specific volume, leading to flow at the speed of sound in the throat when the upstream pressure is at least as high as the critical pressure; in the divergent section the specific volume rises more rapidly than the velocity. The behavior in the convergent section is not influenced by the conditions prevailing downstream of the throat. As used herein, the critical pressure ratio is the minimum ratio of the upstream pressure to the pressure at the exit end of the nozzle at which maximum flow occurs; it is the lowest pressure ratio for producing flow at the speed of sound in the throat.

As appears in FIGURE 3, the nozzles of the two groups are closely interspersed, so that each nozzle 28 of the first group (except those at the periphery of the array) is surrounded by a plurality, e.g., four nozzles 29 of the second group. In this instance the nozzles 28 are larger, both in length and cross section, than the nozzles 29 to carry a greater mass flow of gas. The nozzles are laterally positioned so close to the adjacent nozzles that the surfaces of the divergent walls of adjacent nozzles intersect at the downstream ends of the nozzles. Because the nozzles are circular in cross section this leads to a serrated downstream surface in the plate 27, as appears clearly in FIGURES 5–7.

Each nozzle 28 has the upstream end thereof in communication with a first supply chamber 30 defined by the nozzle plate 27, a rearwardly spaced plate 31 and an annular housing 32. The last is provided with a flanged nozzle 33 to which the pipe 22 is connected. The plate 31 is formed with a plurality of holes 34 (FIGURE 5) extending therethrough and positioned directly in rear of the nozzles 29, and each said hole is connected to a corresponding nozzle by a supply tube 35. As appears in FIGURE 2, the upstream face of the plate 31 adjoins a second supply chamber 36 defined by the plate and a closure 37 which is formed with a flanged nozzle 38 for connection to the pipe 23.

The reactor may be provided with suitable quenching means, such as a spray device 39, and connected to a divergent discharge duct 40, which may be shaped as a subsonic diffuser and connected to a receiver operated at atmospheric, superatmospheric or subatmospheric pressure.

In operation the pressure at which the gases are supplied via the pipes 22 and 23 is regulated in relation to that prevailing in the duct section 10 (e.g., by control of the compressors 16 and 17 and the valve 25 and 24, and/or by regulating the pressure in the receiver into which the duct 40 discharges) to be in excess of the critical pressure ratio. In most instances the ratio will be at least 1.5 of the critical value and higher ratios, leading to accelerations to high Mach numbers can be used, it being understood that the nozzles must be designed to make effective use of the pressure ratio. As was previously noted, it is desirable that the gas streams emanating from all nozzles of both groups have approximately the same although not necessarily exactly equal velocities, and the above-noted controls are adjusted to achieve this result. When the velocities are greatly different, undesired strong shock waves are created and the kinetic energy is dissipated into heat immediately downstream of the plate 27. On the other hand, a small mismatch between the stream velocities, not sufficiently great to cause strong shock waves in the stream (but rather a series of weaker ones near the exit from the nozzle grid) are acceptable. Such a slight mismatch is desirable because it creates a slight turbulence, which promotes lateral mixing across the streams but does not create a sufficiently high temperature—or produces a high temperature for an insufficient time—to initiate the chemical reaction. The magnitude of the acceptable and useful mismatches must be determined empirically for any system because the many variables, such as the reactivity of the gases and the particular design of the nozzles. In general, the slower stream should have a velocity at least 90% of that of the faster stream.

The closely interspersed supersonic gas streams flow through the duct sections 10 and 11 as parallel streams which are peripherally in contact with one another. Lateral mixing occurs between these streams. Although mixing between supersonic streams is inherently slow, the subdivision of the source streams into smaller streams and the mild lateral waves caused by the small mismatch in stream velocities reduce the axial length in the mixing duct required to complete the mixing. Typically, the smooth-walled, empty duct has a length of 20 to 200 times the maximum (discharge) diameter of the larger nozzles 28. Thus mixing can be completed to any desired extent while the streams are at supersonic velocity and without flowing through any strong shock wave.

As previously noted, it is useful to diverge the mixing section 11 slightly. The wall friction produces drag and a boundary layer growth, which is then compensated by a diverging channel and a slightly falling pressure. (See Lippmann and Pluckett, "Aerodynamics of a Compressible Fluid," 1947, page 82, item 3.)

The gases, when mutually reactive, are initially heated by the heating elements 20 and 21 such that their average is at least as high as reaction temperature. Their temperatures may be the same or different. However, when flowing through the supersonic nozzle they undergo a significant drop in temperature so that when the gases are brought into contact at the downstream ends of the nozzle they are below reaction temperature. Because of the undisturbed supersonic flow they remain at the depressed temperature until mixing is complete or complete to any desired extent.

When the mixed gases flow past the wedge 13 standing shock waves are formed as indicated at w. This induces a sharp and strong rise in the temperature of the gases, causing the chemical reaction to commence. The chemical reaction may be quenched by the spray 39 and the quenched mixture is discharged through the subsonic diffuser duct 40.

As was indicated above, the invention may also be embodied with nozzles of other outlines. Thus, FIGURES 8-10 show the use of two-dimensional nozzles. Reference numbers, increased by one hundred, denote parts corresponding to those previously described. In this embodiment the nozzle array is formed in a plate 127 in which is formed a first group of nozzles 128, interspersed with a second group of nozzles 129. Each of these nozzles has an oblong, specifically rectangular, cross section, such that the opposed, diverging side walls are flat and longer transversely to the nozzle axis than their interval at the downstream end of the nozzle. Thus, the nozzles 128 have side walls 128d which diverge from the rectangular throat 128t, which, in turn, is joined to a convergent section 128c. The smaller and shorter nozzles 129 have corresponding and similarly shaped parts. The "width" of a narrow stream or nozzle, when two-dimensional, refers to the distance between the said divergent side walls at the nozzle outlet.

The plate 127 is juxtaposed to a closure plate 131 having holes 134 aligned with the upstream ends of the nozzles 128 to admit one gas thereto. The plate 127 is formed with a transverse supply channel 130 for each nozzle 129 and in communication with the upstream ends thereof, these channels being in communication with a common supply channel 133 which is also formed in the plate; the channels 130 and 133 are closed by the plate 131. The channel 133 is enlarged at 133a for connection to a supply pipe, such as the pipe 22. It is understood that the nozzle plate may be mounted as was shown in FIGURES 1 and 2 to admit one gas into a supply chamber adjoining the plate 131 and the other gas via the channel 133.

Operation of the second embodiment is as was described above.

We claim as our invention:

1. Method of mixing at least two gas streams which comprises the steps of supplying separate streams of each of said gases at sub-sonic velocities, subdividing each of said streams into a group of smaller, narrow streams, accelerating the gas of each said narrow streams to supersonic velocity, discharging the resultant supersonic streams in a substantially common direction in closely interspersed relation into one end of an elongated mixing zone, flowing said streams through said mixing zone at supersonic velocity, and effecting lateral mixing between said narrow streams of different groups during said flow.

2. Method according to claim 1 wherein said narrow streams are flowed through said mixing zone continuously at supersonic velocity exceeding twice the velocity of sound throughout a distance at least twenty times the maximum width of the widest of said narrow streams at the upstream ends thereof.

3. Method according to claim 2 wherein the velocities of said narrow streams are all at least 90% of the velocity of any of said other streams.

4. Method according to claim 1 wherein said narrow streams of one group are discharged at a velocity which is less than but not below 90% of the velocity of the narrow streams of the other group.

5. Method according to claim 1 wherein said narrow streams of both groups are discharged at substantially a common supersonic velocity.

6. Method according to claim 1 which includes the step of flowing the resultant mixture at the downstream end of said zone past a partial flow obstruction in the path of the mixture and thereby creating a strong shock wave and rise in the temperature of the mixture.

7. Method according to claim 1 wherein said narrow streams are flowed through said mixing zone continuously at supersonic velocity exceeding twice the velocity of sound throughout a distance at least twenty times the maximum width of said narrow streams at the upstreams thereof, said method including additionally the step of flowing the resultant mixture, after traversing the said distance, past a partial flow obstruction in the path of the mixture and thereby creating a strong shock wave and rise in the temperature of the mixture.

8. Method of mixing at least two chemically reactive gas streams which comprises the steps of supplying separate streams of each of said gases at subsonic velocity and at elevated temperatures such that their average temperature is above reaction temperature, subdividing each of said streams into a group of smaller, narrow streams, accelerating the gas of each said narrow streams to supersonic velocity sufficient to thereby cool the gases to below reaction temperature, discharging the resultant, cooled supersonic streams in a substantially common direction in closely interspersed relation into one end of an elongated mixing zone, flowing said streams through said mixing zone continuously at said supersonic velocity and without chemical reaction between the gases thereof for a distance at least twenty times the maximum width of the widest of said narrow streams at the upstream ends thereof and effecting lateral mixing between said streams of different groups during said flow and thereafter flowing the resulting mixture past a partial flow obstruction in the path of the mixture and thereby creating a strong shock wave and effecting a rise in the temperature of the mixture.

References Cited in the file of this patent
UNITED STATES PATENTS
2,767,233   Mullen et al. _____ Oct. 16, 1956